United States Patent
Przygoda

(10) Patent No.: US 7,350,871 B2
(45) Date of Patent: Apr. 1, 2008

(54) EQUIPMENT AND SUPPLIES LIFT ACCESSORY

(76) Inventor: George M. Przygoda, 5873 White Walnut Rd., Pickneyville, IL (US) 62274

( * ) Notice: Subject to any disclaimer, the term of this patent is extended or adjusted under 35 U.S.C. 154(b) by 4 days.

(21) Appl. No.: 11/358,788

(22) Filed: Feb. 21, 2006

(65) Prior Publication Data
US 2006/0186684 A1    Aug. 24, 2006

Related U.S. Application Data

(60) Provisional application No. 60/655,873, filed on Feb. 24, 2005.

(51) Int. Cl.
*B60P 1/04* (2006.01)
(52) U.S. Cl. ................................... 298/17 R
(58) Field of Classification Search ............. 298/17 R, 298/23 R, 23 TT, 17 SG; 296/50, 51, 56; 410/3, 4, 24
See application file for complete search history.

(56) References Cited

U.S. PATENT DOCUMENTS

| | | | |
|---|---|---|---|
| 1,792,586 A | 2/1931 | Higgins | |
| 2,966,275 A | 12/1960 | Brookins | |
| 3,688,649 A * | 9/1972 | Hostetler | 92/110 |
| 4,088,235 A * | 5/1978 | Thacker | 414/537 |
| 4,787,809 A * | 11/1988 | Zrostlik | 414/557 |
| 4,813,842 A * | 3/1989 | Morton | 414/557 |
| 4,906,039 A | 3/1990 | Broman | |
| 5,176,486 A * | 1/1993 | Park | 414/472 |
| 5,611,119 A | 3/1997 | Allen | |
| 5,641,262 A * | 6/1997 | Dunlop et al. | 414/557 |
| 5,738,259 A | 4/1998 | Allen | |
| 6,033,178 A | 3/2000 | Cummins | |
| 6,224,127 B1 | 5/2001 | Hodge | |
| 6,244,637 B1 * | 6/2001 | Leonhardt et al. | 293/102 |
| 6,354,788 B1 * | 3/2002 | Adams | 414/537 |
| 6,966,608 B1 * | 11/2005 | Miller | 298/17 R |

* cited by examiner

*Primary Examiner*—H Gutman
(74) *Attorney, Agent, or Firm*—Paul M. Denk

(57) ABSTRACT

An accessory for use in conjunction with a utility vehicle for the lifting and hauling of equipment and supplies, including an integrated platform base, either of a grid work of supporting frames and rods, or of a solid platform type, having upright columns and bracings for support, with a hooked configuration extending forwardly from the upper end of the upright columns, formed of a series of structural member and rods, for securement onto the upper edge of the tailgate or back wall of the bin or carrier of a utility vehicle. Structural support through the use of further rods can connect onto a portion of the accessory, and be fastened structurally to the front of the utility vehicle to add additional strength to the accessory during usage.

10 Claims, 4 Drawing Sheets

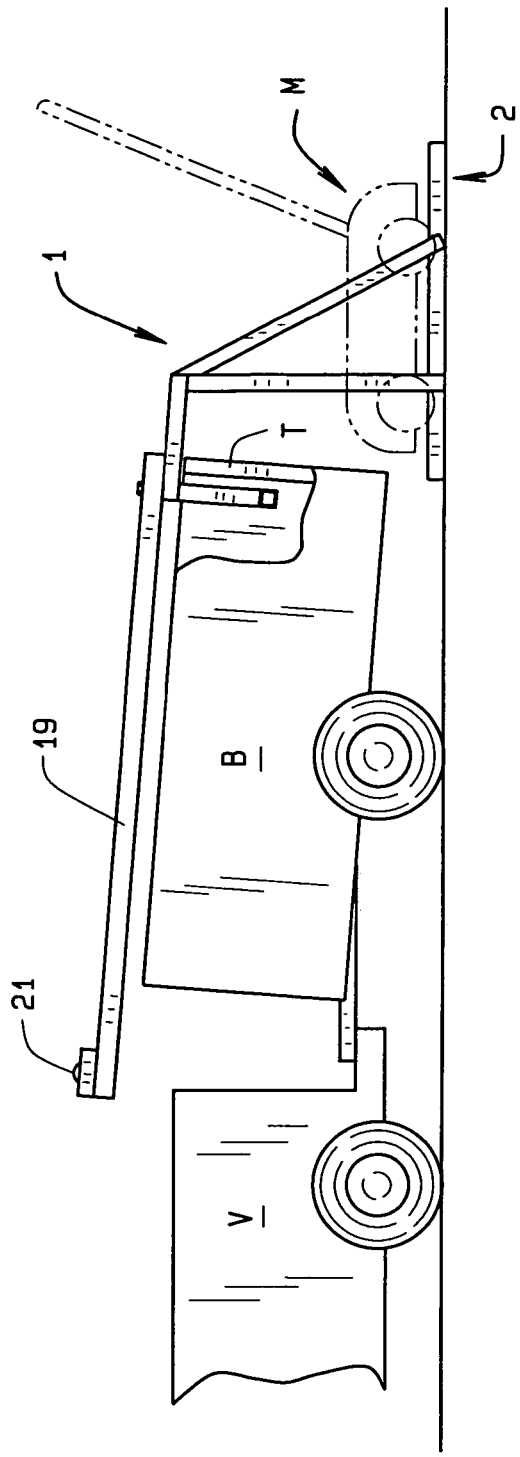
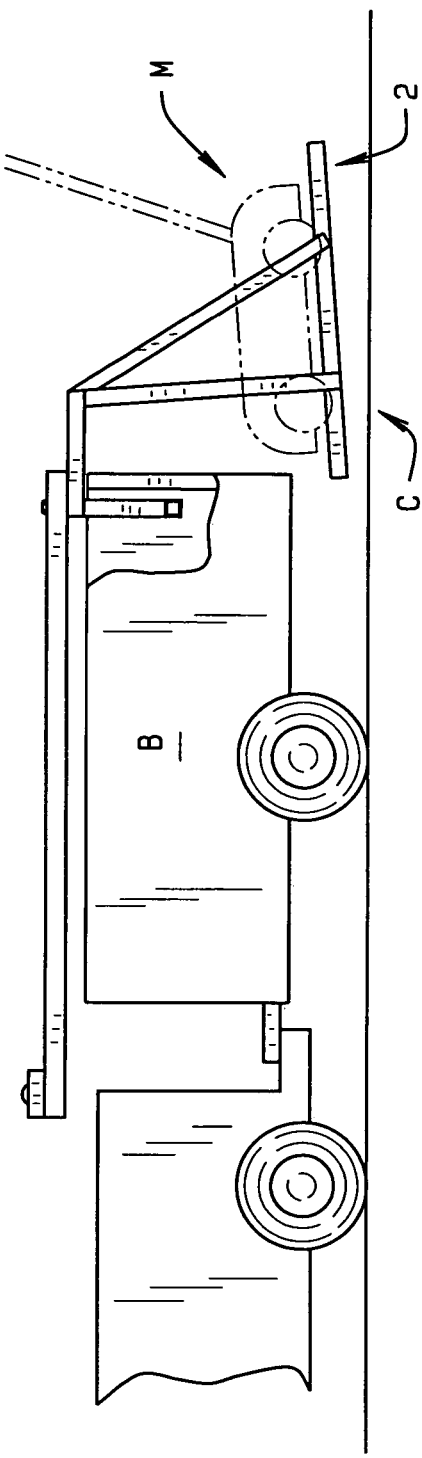

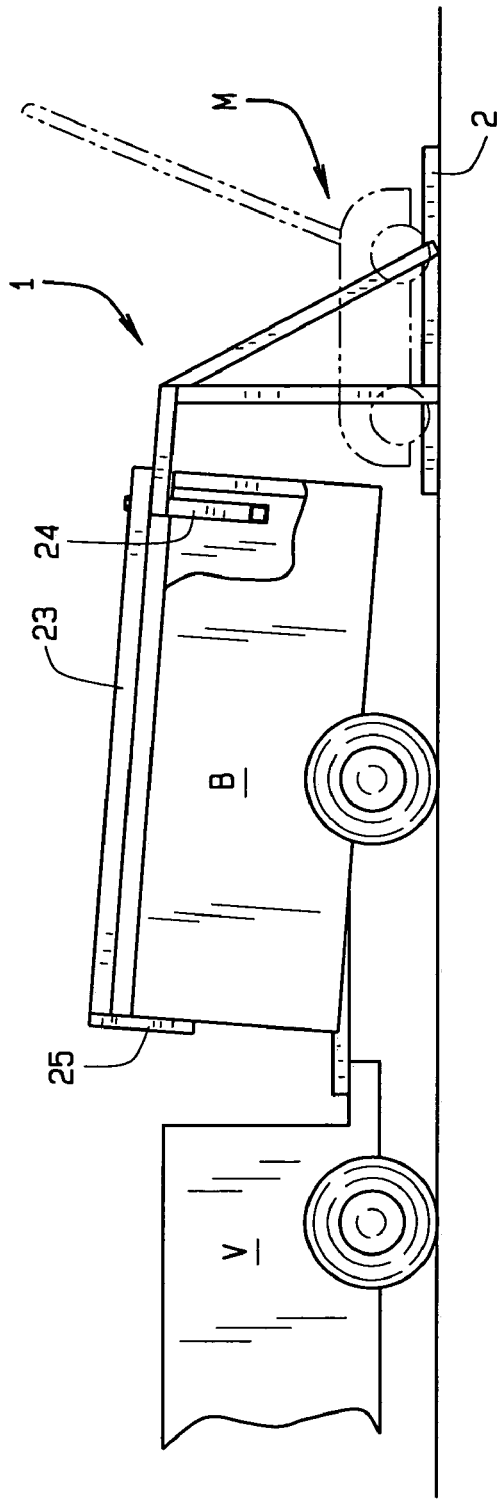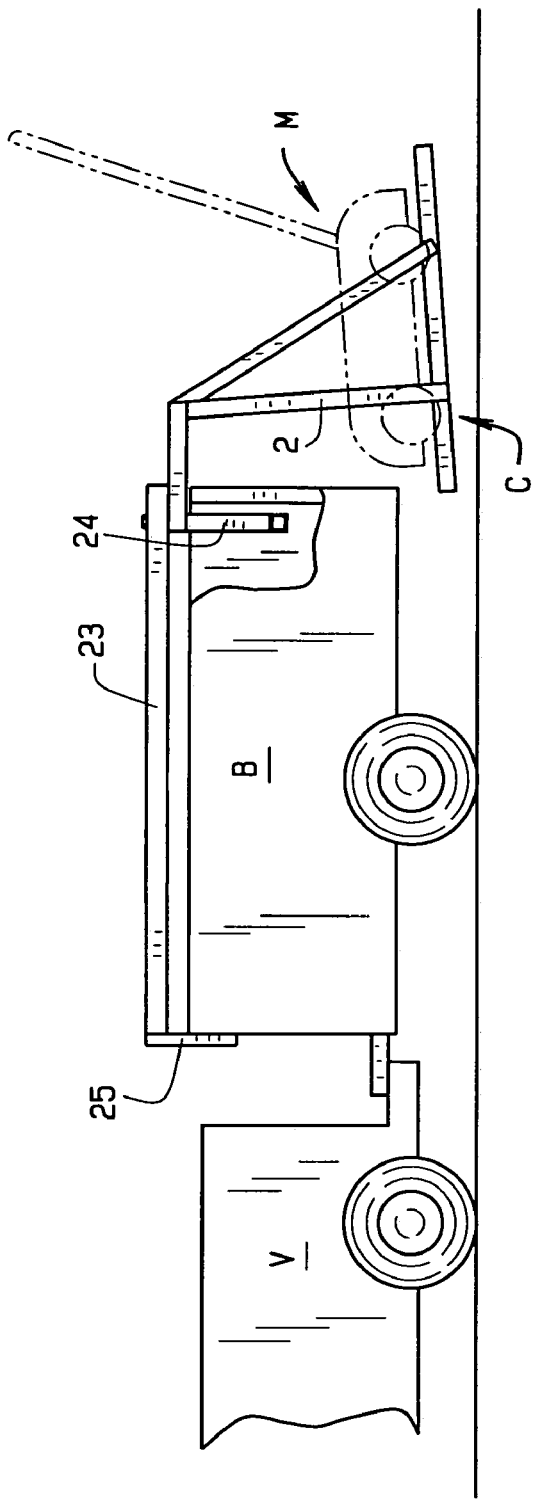

EQUIPMENT AND SUPPLIES LIFT ACCESSORY

CROSS REFERENCE TO RELATED APPLICATION

This nonprovisional patent application claims priority to the provisional patent application having Ser. No. 60/655,873, which was filed on Feb. 24, 2005.

BACKGROUND OF THE INVENTION

This invention relates primarily to a lifting device, and more specifically to an accessory that may attach to a cart, utility vehicle, such as a four wheeler, particularly of the utility vehicle type that is used, for example, upon a golf course, and the like, and which accessory can be used for the support and conveyance of other equipment such as a lawn mower, greens mower blower, or even supplies, such as heavy bags of fertilizer, or mulch, that may be transported around the golf course, a construction site, or at other locations where such a vehicle is used. For example, this type of a device could even be used at the construction location, for conveying bags of cement, sand, or the like, to other locations.

Various types of conveying apparatuses have been used in the art. For example in the patent to Higgins, U.S. Pat. No. 1,792,586, therein is shown a bagging platform for coal trucks. This is a frame that is hooked onto the back end of a coal truck, to support a receptacle, bag, or the like, upon a floor plate, so that when the truck is tilted, as by tilting of its truck body, coal will pass out of its chute and into its bag, for packaging and for the supply of coal apparently to the market.

The patent to Brookins, U.S. Pat. No. 2,966,275, shows an equipment carrier. This carrier includes a type of hoist mechanism, which is mounted onto the upper end of a tailgate, for a tilt truck, and then a piece of equipment, such as the road roller as shown, is hooked thereto, by means of a hoist strap, and when the truck bed is repivoted into an operative position, it lifts the equipment for transit.

The patent to Broman, U.S. Pat. No. 4,906,039, discloses an equipment carrier for turf maintenance vehicle. This particular carrier includes a truck bed, that is capable of tilting, between its usable conveying position, and its tiltable or dumping position. But it includes a carrier portion that connects by looping over the tailgate, and which is connected by means of pivot pins, so that when the truck bed is pivoted, a piece of equipment can be driven thereon, but that when the truck bed is leveled, for transit, the piece of equipment is held suspended in a position for transit, as can be noted.

The patent to Allen, U.S. Pat. No. 5,611,119, shows a strap tensioning system. This device apparently shows a strapping system for looping onto the tailgate of a truck. This system is for use for holding one or more bicycles to the back end of a truck, as during transit.

Another patent to Allen, U.S. Pat. No. 5,738,259, shows a further variation upon the strap tensioning system as previously reviewed.

The patent to Cummins, U.S. Pat. No. 6,033,178, shows a device for holding a trash container, and lifting it, on the back end of a transporting device. This is a type of bracket mechanism that can operate its various lever means, for shifting a refuse container from a standing position, to an off ground position, as noted.

Finally, the patent to Hodge, U.S. Pat. No. 6,224,127, shows a modified tailgate. This is a bracket assembly that connects and mounts onto the tailgate of truck.

The current invention is a much more simplified structural device, that hooks onto the back of the wall of a bin, bed, or the like, for one of the smaller utility carts, such as the four wheeler, as used on a golf course, and which can conveniently be tilted into position where a lawn mower or greens mower may be driven directly thereon, or one that may utilize a solid support base, and can have bags of construction materials, fertilizers, and other tools and equipment located thereon, such that when the bin is repivoted into its horizontal position, for movement of the vehicle, and lifts all of these types of materials of the ground, for transit. This greatly alleviates the need for workers to have to pick up a fertilizer spreader lawn mower, leaf blower or even a greens mower, and shift it onto the bed of the utility truck, which is a very heavy and arduous task, or for having to lift heavy bags of construction materials, or fertilizers, onto the truck bed, when they can be simply shifted at ground level onto the platform of this carrier accessory, for transit to a different location.

SUMMARY OF THE INVENTION

As stated, this device is an equipment carrier, the type that is for holding lawn mower equipment, supplies, and the like, onto such an accessory, and then be lifted off the ground, for transit to a different location. As explained, and as can be understood, the fairly large leaf blowing equipment, cutting apparatus, and the like, as are utilized around the golf course, can be far more easily handled, and transported, to other locations, with a minimum of effort. Normally, these types of equipment are moved about the golf course on a trailer that hooks onto the back of the four wheeler, such as the EZ-GO four wheeler, and these are types of carriers that are used on golf courses to haul equipment around, to carry rubbish, bags of supplies, or other equipment, or the like. Other types of trailers are normally the standard four feet by six feet trailer, and such heavy equipment must be lifted thereon, for transport.

This particular invention is devised as an accessory and in the configuration of a type of frameworked bracket, that functions as a carrier. One simply tilts the bin or truck bed of the four wheeler downwardly, and the framework of this accessory can be simply applied onto the tailgate or back wall of the four wheeler bed, and may be used in that position. On the other hand, to add further stability, a bar that hooks onto the accessory, and onto the truck bed, can be further applied, and secured to the front of the truck bed, and then bolted in place, to enhance the structural integrity of this accessory, when applied to such a carrier, and when used for hauling heaving equipment around the grounds. When the four wheeler truck bed is tilted up, whereby the back of it is lowered, as for unloading, the framework and platform for this accessory firmly rest upon the ground, whereby a greens mower, fertilizer spreader, or leaf blower, may simply be moved or shifted thereon, or off of the same, with a minimum of effort. No straps or tie downs are needed. Or, bags of heavy supplies can be simply loaded onto the platform of this accessory, for further conveyance. Then, when the carrier or bin is repivoted, and the truck bed is moved upwardly into a level position, for transit, the entire framework for this accessory is lifted off the ground, and actually elevates approximately four inches off of the ground at the maximum position, which allows the heavy piece of equipment to be freely moved, by the four wheeler, any where around the golf course, construction site, or the like, for usage.

The framework simply includes a base platform, that may be configured of a rectangular or square frame, having supporting framing intermediate thereof. Or, the framework may include a solid base, so that bags or other equipment can be simply rested thereon, for transit. Then, main support columns extend upwardly from the base framework, and diagonal or other support bracings extend upwardly from the framework, to secure with the upright columns, and then are integrally formed with a hooked configuration, that may locate over the tailgate of the truck, during usage. In addition, the hooked portion may also include a structural rod, that extends forwardly, and at its forward end may be secured onto the front of the truck bed or bin, to add further stability to the carrier accessory, as during usage.

It is, therefore, the principal object of this invention to provide an equipment carrier in the form of an accessory that may be easily applied to the bin or truck bed of a utility vehicle, such as a four wheeler, to facilitate and ease the lifting or locating of equipment thereon, for prompt transit.

It is another object of this invention to provide a framework accessory that can move equipment very easily and expeditiously.

A further object of this invention is to provide an accessory, for a truck bed, that requires no heavy exertion or excessive time for installation or loading.

Another object of the invention is to provide an equipment carrier accessory that can be very easily and facilely applied to the back wall or tailgate of a utility vehicle bin, for use for holding other equipment.

Another object of this invention is to provide an equipment accessory that is integrally formed, self-contained, and which can be easily handled by a single worker, during installation and usage.

Another object of this invention is to provide an equipment accessory for application to a utility vehicle that is designed to lift and transport various items, such as various types of mowers that are used upon a golf course, one that may be used for manicuring the greens, another for cutting the fairways, and upon which heavy equipment can be easily transported, from location to location, in very little time through the exertion of a minimum of effort.

Still another object of this invention is to provide a carrier accessory for application to a utility vehicle, which when the vehicle bed is tilted, the platform base of this accessory mounts flat upon the ground, to easily allow a fertilizer spreader or other mower to be installed thereon.

Yet another object is to provide a tailgate accessory for use as a carrier and which when tilted into its lifting and carrying position, provides adequate clearance from the ground, so that the utility vehicle, to which it is applied, can easily move about the hills and valleys of, for example, a golf course, or other landscaping, with little effort, or obstruction.

These and other objects may become more apparent to those skilled in the art upon review of the summary of the invention as provided herein, and upon undertaking a study of the description of the preferred embodiment, in view of the drawings.

BRIEF DESCRIPTION OF THE DRAWINGS

In referring to the drawings.

FIG. 6 shows the accessory of this invention applied to the carrier or bin of a utility vehicle, and which when tilted, locates the platform base of the accessory flat upon the ground;
FIG. 7 shows the utility vehicle bin repivoted into its horizontal and usable position, thereby lifting the carrier off the ground, for freedom of movement of any equipment, such as the lawn mower, to other locations;
FIG. 8 provides a view of the accessory of this invention as applied to the carrier or bin of a dump truck, and which has further structural reinforcement to provide for its retention to the bin;
and
FIG. 9 shows the vehicle and accessory of FIG. 8, after the dump truck has been pivoted into its usable position, thereby lifting the accessory, and its load, off of the ground.

DESCRIPTION OF THE PREFERRED EMBODIMENT

Figure 1:
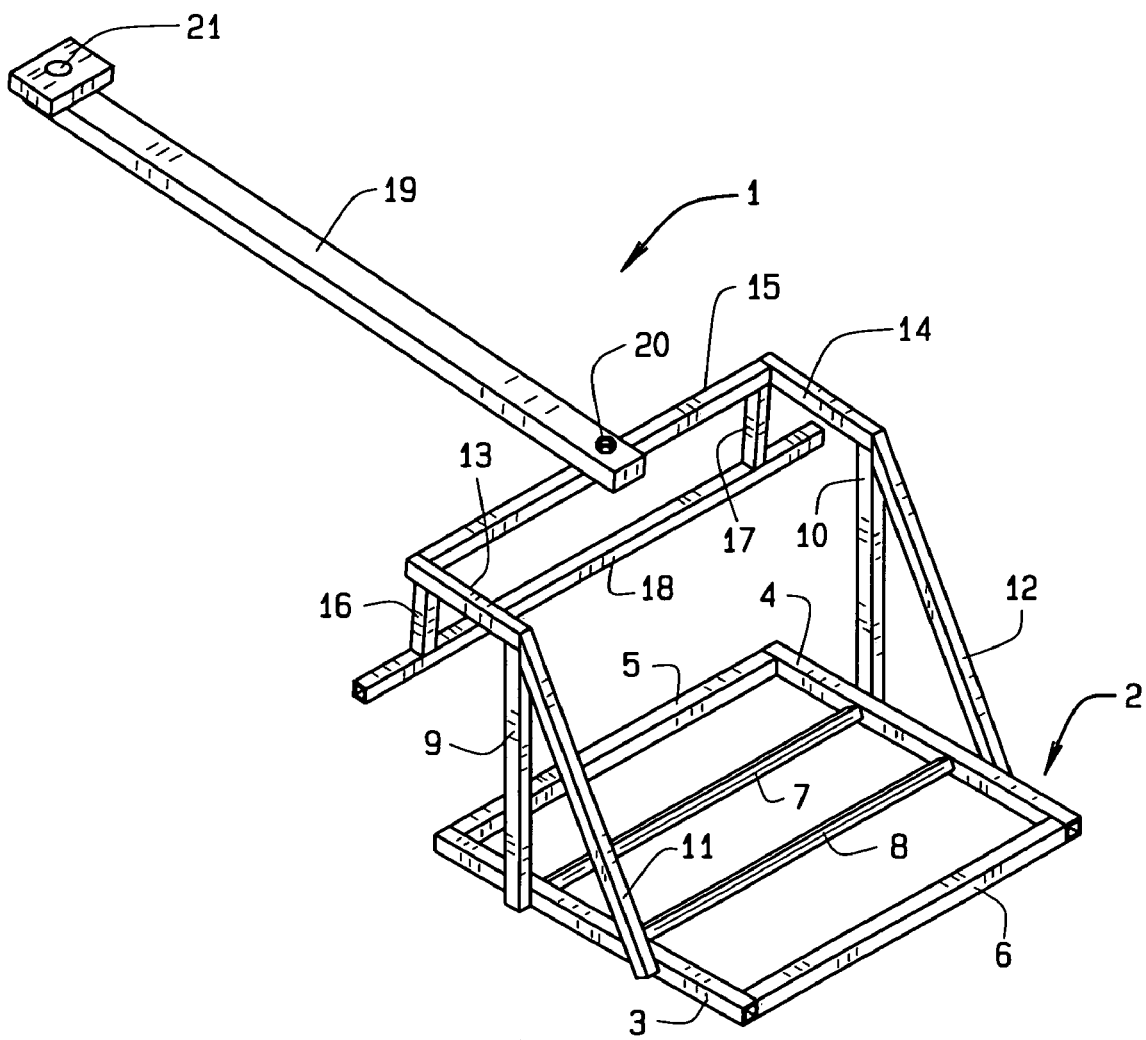
FIG. 1 is an isometric view of the equipment and supplies lifting accessory of this invention.

In referring to the drawings, and in particular FIG. 1, the accessory 1 of this invention is readily disclosed. It includes a framework base 2 comprised of perimeter frames 3 and 4, laterally disposed, and front and back frames 5 and 6, which form the base platform, and which have the series of reinforcing rods 7 and 8 arranged intermediate thereof, to add structural strength to the platform, and to act as a support for any equipment that is provided thereon.

Extending upwardly from the sides of the framework 2 are a pair of upright columns 9 and 10, which are welded or otherwise secured to the sides of the frames 3 and 4, and a pair of bracings 11 and 12 extend upwardly, as along a diagonal, from the approximate back of the framework, and connect with the upright columns 9 and 10, to provide a stable construction for lifting of the framework, as it hauls heavier equipment. Extending forwardly from the apex of the upright columns 9 and 10, and the diagonal bracings 11 and 12, are a pair of forwardly extending members 13 and 14, which connect with a horizontal rod 15, to form an upwardly and forwardly extending support structure, for linking onto the back wall or tailgate of any bin or truck bed, associated with a utility vehicle, as previously explained. In order to form a hooked configuration for providing for the attachment of this accessory onto the tailgate of a truck, there are downwardly extending bracings 16 and 17, being arranged at the ends of the rod 15, and which connect with a downwardly disposed rod 18, and it can readily be understand that when this accessory is applied over the back upper edge of a tailgate, or the back wall of a storage bin, the accessory is readily applied in place, to prepare it for prompt usage. Finally, and optionally provided, is a forwardly extending structure, as noted at 19, with its back end being fastened, as at 20, to the rod 15, while its front end provides means for connection, as at 21, to the forward portion of the utility vehicle, or the front wall of its truck bed, in order to add further stability for support of the accessory 1, when installed, and particularly when used for hauling heavy equipment.

Figure 2:
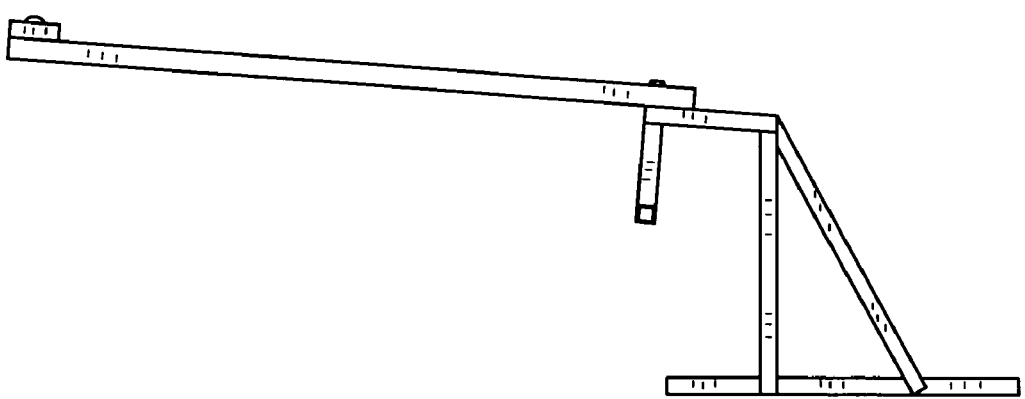
FIG. 2 is a side view thereof.

The relationship of the various components when assembled into the structure of this accessory can readily be seen in FIG. 2.

Figure 3:
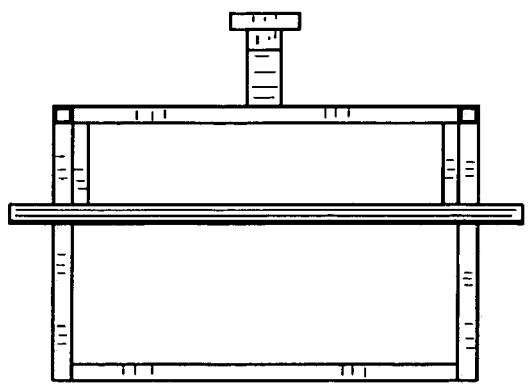
FIG. 3 is a front view thereof.

FIG. 3 shows a front view of the accessory, and the relative width of the various components that are used in conjunction with the assembly of the accessory, for usage. Generally, the device has a width approximating the back end of the utility vehicle, and its conveying bin, so that wider type of equipment, such as a riding mower, or lawn mower, can easily be applied thereon.

Figure 4:
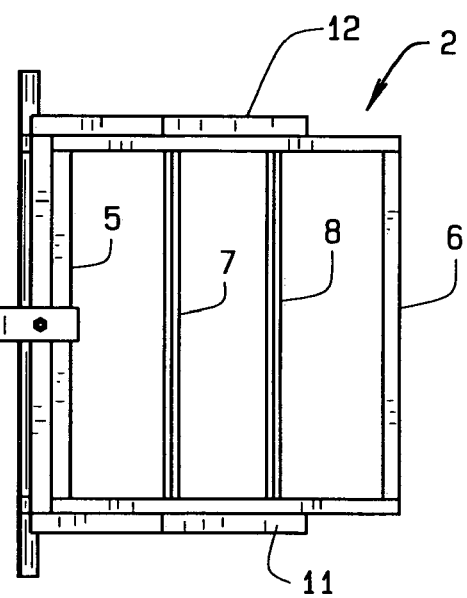
FIG. 4 is a top plan view.
Figure 4:
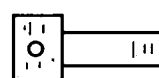

As can be noted in FIG. 4, the platform base 2 has various rods and framework, in particular the intermediate support rods 7 and 8, that are designed for accommodating the wheels of a mower, of the type as shown in FIG. 6 and FIG. 7 at M, so the wheels can be embraced by and between the cross rods 7 and 8, and the front and rear frames 5 and 6, as can be readily noted. In addition, since the vertical columns 9 and 10, and the diagonal bracings 11 and 12 are uniquely spaced at both the approximate front, and the approximate rear, of the platform base, uniform support for lift of such heavy equipment is readily provided.

Figure 5:
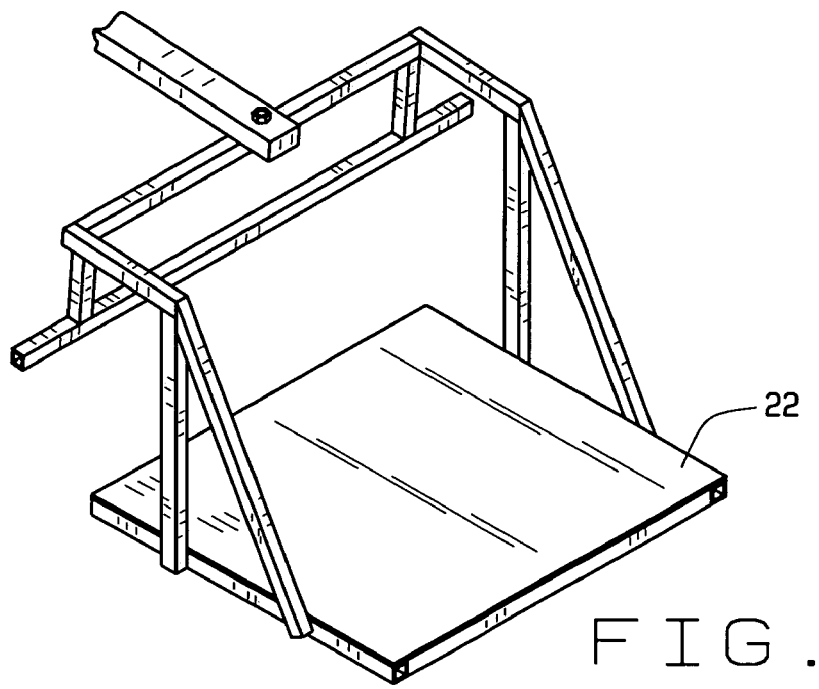
FIG. 5 shows a modification where the base platform for the accessory is formed as a solid sheet.

FIG. 5 shows the same structure for the accessory of this invention, but the platform base 2 is now constructed as a solid base 22, so that other supplies may be conveyed, such as tools, bags of cement, sand, fertilizer, or other bulky items, without falling through the platform base, of the type as shown at 2.

In usage of this particular invention, FIG. 6 shows how the bin B of the utility vehicle V can be tilted, with the style of a trailer that is tilted upwardly at the front, or such as a truck bed B that can be pivoted between a loaded position, and a dumping position, in a manner as shown in FIG. 6. Then, the accessory 1 can be hooked over the tailgate T, and have its structural supporting rod 19 secured at the front end, by means of the fastening 21, to the front wall or other structure of the bin B, for further support. When the bin is tilted, in the manner as shown in FIG. 6, its platform base 2 is flat upon the ground, and a lawn mower, or riding mower, as at M, can simply be driven or pushed thereon, with a minimum of effort, ready for conveyance. As can be seen in FIG. 7, when the bin B is repivoted back into its horizontal and conveying position, the accessory 1 is lifted off the ground, its platform base 2 has adequate clearance from the ground, as can be noted at C, and ready for conveyance of the mower, as can be noted. This is an example as to how this device can be very easily used, requires a minimum of exertion of the user to load and haul heavy equipment, or in the case where the platform 22 is applied, as noted in FIG. 5, bags of material or other equipment can be easily applied thereon, when it rests flat upon the ground surface, as noted in FIG. 6, and which then can be easily lifted, as noted in FIG. 7, for transport. Heretofore, such equipment or supplies had to be loaded, through lifting, onto the bin B, where this tailgate T has opened, which, in some instances, can require significant effort, and usually requires the strength of more than one worker, to achieve such. Through usage of this current invention, a single worker can accommodate the handling of all of these tasks, without much effort. Thus, it can be seen how this accessory greatly facilitates the efforts of the worker, at a construction site, at a golf course, or at any other place where a utility vehicle, with this type of an accessory is employed.

FIG. 8 shows the utility vehicle V with its truck bed B in tilted position, as during the dumping of its contents. But, in this instance, the vehicle has the accessory 1 applied thereto. As shown, the accessory platform base 2 is rested upon the ground, and this is because the bin B of the truck is tilted into its unloading position. The accessory further includes its structural supporting rod 23 that extends rearwardly from the upper end of the accessory, and this rod includes a downwardly extending brace 24, that is arranged contiguous with the interior of the backside of the bin B, while the front end of the supporting rod 23 has a downwardly extending front brace 25, that can be fastened to the front edge of the truck bin, as can be seen. In this position, the accessory is fully supported relative to the entire truck bed B, in order to allow for its structural strength to lift the accessory depending upon the type of machinery, such as the mower M that may be provided thereon.

FIG. 9 shows how the truck bed B has been tilted forwardly, so as to place it into its conveying position. When this occurs, the supporting rod 23 follows the upper edge of the bin B, and its braces 24 and 25 tilt the accessory to upwardly, off of the ground, with adequate clearance, as to be seen at C, to allow for conveyance of the mower or other utility device M, as can be noted. Thus, the accessory is fully supported, along the entire length of the truck bed B, as can be seen.

Variations or modifications to the subject matter of this invention may occur to those skilled in the art upon reviewing the disclosure as provided herein. Such variations, if within the spirit of this development, are intended to be encompassed within the scope of the invention as defined. The particular components of the accessory as described herein, and as shown in the drawings, are set forth for illustrative purposes only.

The invention claimed is:

1. An accessory for use in conjunction with a vehicle dump truck having a tiltable bin and which accessory when applied to the tiltable bin of the dump truck can provide for conveyance of other machinery or loads, comprising, said accessory incorporating a framework base, upper structure operatively associated with the framework, and extending vertically thereabove, and for use for engagement with the back end of the tiltable bin of the dump truck, upright column means intermediate the framework base and the upper structure, and integrally secured therewith to provide stability for said accessory for use for holding other machinery or loads for conveyance, a upper structure having a down turned portion, arrange forwardly of said accessory, and designed for hooking on to a upper rear edge of the tiltable bend of the dump truck, to provide for connection of said accessory thereto, the tiltable bend of the dump truck is pivoted during usage.

2. The accessory of claim 1 and including said upright columns provided to either side of the framework base, and connecting laterally with said upper structure, to provide an integral structure for said accessory during usage for conveyance of any load.

3. The accessory of claim 2 wherein the upper structure of the accessory includes a horizontal rod, disposed laterally within said upper structure, and said disposed rod having a width approximating the internal width of the truck bin, to provide for centering of the accessory upon the back end of the truck bin, and to prevent its lateral shifting during usage.

4. The accessory of claim 2 and including a forwardly extending brace, connecting at its back end to the upper structure of the accessory, and capable of connecting at its front end to the truck bin, during installation.

5. The accessory of claim 4 wherein the front end of the forwarding extending brace threadedly engages with the front edge of the truck bin.

6. The accessory of claim 4 wherein the front end of said forwarding extending brace includes a downwardly extending brace, said downwardly extending brace capable of being secured to the front end of the vehicle bin, to provide for its mounting thereto for structural support during usage for conveyance of a load.

7. The accessory of claim 6 and including said horizontal rod of said upper structure arranged approximate upwardly of the vehicle bin to which said horizontal rod mounts.

8. The accessory of claim 6 wherein the horizontal rod of the upper structure extends downwardly into the vehicle bin, and is disposed downwardly in the bin during its installation.

9. The accessory of claim 1 wherein the framework base is formed of a series of laterally disposed frames.

10. The accessory of claim 1 wherein the framework base is formed of a solid platform.

* * * * *